United States Patent
Willermoz et al.

(10) Patent No.: US 10,231,290 B2
(45) Date of Patent: Mar. 12, 2019

(54) ELECTROMAGNETIC INDUCTION FURNACE AND USE OF THE FURNACE FOR MELTING A MIXTURE OF METAL(S) AND OXIDE(S), SAID MIXTURE REPRESENTING A CORIUM

(71) Applicant: COMMISSARIAT A L'ENERGIE ATOMIQUE ET AUX ENERGIES ALTERNATIVES, Paris (FR)

(72) Inventors: Guy Willermoz, Meyrargues (FR); Laura Panaget, Pertuis (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 580 days.

(21) Appl. No.: 14/787,149

(22) PCT Filed: Apr. 25, 2014

(86) PCT No.: PCT/IB2014/061004
§ 371 (c)(1),
(2) Date: Oct. 26, 2015

(87) PCT Pub. No.: WO2014/174489
PCT Pub. Date: Oct. 30, 2014

(65) Prior Publication Data
US 2016/0113071 A1 Apr. 21, 2016

(30) Foreign Application Priority Data
Apr. 26, 2013 (FR) ...................................... 13 53840

(51) Int. Cl.
*H05B 6/42* (2006.01)
*C21C 5/52* (2006.01)
(Continued)

(52) U.S. Cl.
CPC ............. *H05B 6/42* (2013.01); *C21C 5/5241* (2013.01); *F27B 14/061* (2013.01); *F27B 14/14* (2013.01);
(Continued)

(58) Field of Classification Search
CPC ... H05B 6/02; H05B 6/22; H05B 6/24; H05B 6/26; H05B 6/36; H05B 6/42;
(Continued)

(56) References Cited

U.S. PATENT DOCUMENTS 5,319,670 A * 6/1994 Fox .......................... H05B 6/32
219/648
5,837,055 A * 11/1998 Yamada ................ F27B 14/063
117/82

(Continued)

FOREIGN PATENT DOCUMENTS

EP 0747648 A1 12/1996
EP 1762809 A1 3/2007
(Continued)

OTHER PUBLICATIONS

Aug. 4, 2014 Search Report issued in International Patent Application No. PCT/IB2014/061004.

*Primary Examiner* — Brian W Jennison
(74) *Attorney, Agent, or Firm* — Oliff PLC

(57) ABSTRACT

An electromagnetic induction furnace which is intended to melt at least one electrically conductive material, such as an oxide and/or a metal, and which includes at least one inductor having at least one turn and at least one cooling circuit suitable for cooling at least the inductor. Said furnace is characterized in that the heat-transfer fluid of at least one cooling circuit is supercritical $CO_2$. The invention also relates to a method for operating the furnace and to the use thereof for melting a mixture of metals (steel, zirconium, (Continued)

Figure 1:
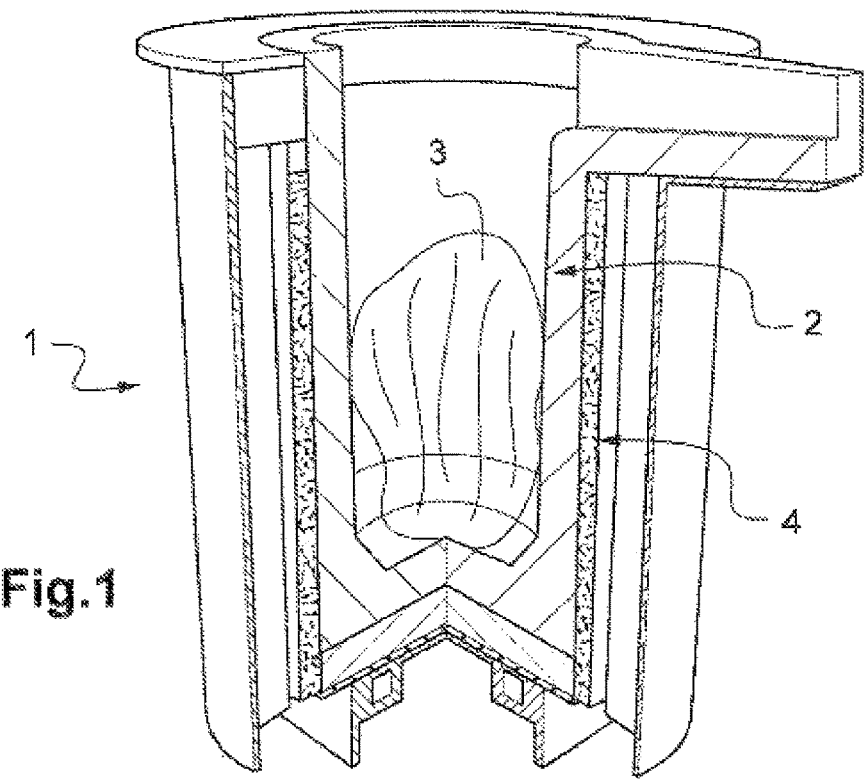

etc.) with oxides (uranium UO2, zirconium, etc.), as well as concrete components, the mixture representing a corium.

16 Claims, 4 Drawing Sheets

(51) Int. Cl.
*F27B 14/06* (2006.01)
*F27B 14/14* (2006.01)
*H05B 6/24* (2006.01)
*H05B 6/36* (2006.01)

(52) U.S. Cl.
CPC .............. *H05B 6/24* (2013.01); *H05B 6/367* (2013.01); *Y02P 10/253* (2015.11)

(58) Field of Classification Search
CPC ........ H05B 6/367; F27B 14/061; F27B 14/14; F27B 11/00; F27B 11/12
USPC ........................................................ 373/154
See application file for complete search history.

(56) References Cited

U.S. PATENT DOCUMENTS

| | | | |
|---|---|---|---|
| 5,901,169 A * | 5/1999 | Kobayashi | H05B 6/24 373/142 |
| 7,267,161 B2 | 9/2007 | Colasson et al. | |
| 2004/0196887 A1* | 10/2004 | Schmidbauer | C03B 5/021 373/138 |
| 2009/0118126 A1* | 5/2009 | Burke | H01L 39/2461 505/211 |
| 2009/0277188 A1* | 11/2009 | Teegen | F25B 39/028 62/50.2 |
| 2014/0239553 A1 | 8/2014 | Bamberg et al. | |

FOREIGN PATENT DOCUMENTS

| | | |
|---|---|---|
| EP | 2572815 A1 | 3/2013 |
| WO | 2013/020042 A1 | 2/2013 |

* cited by examiner

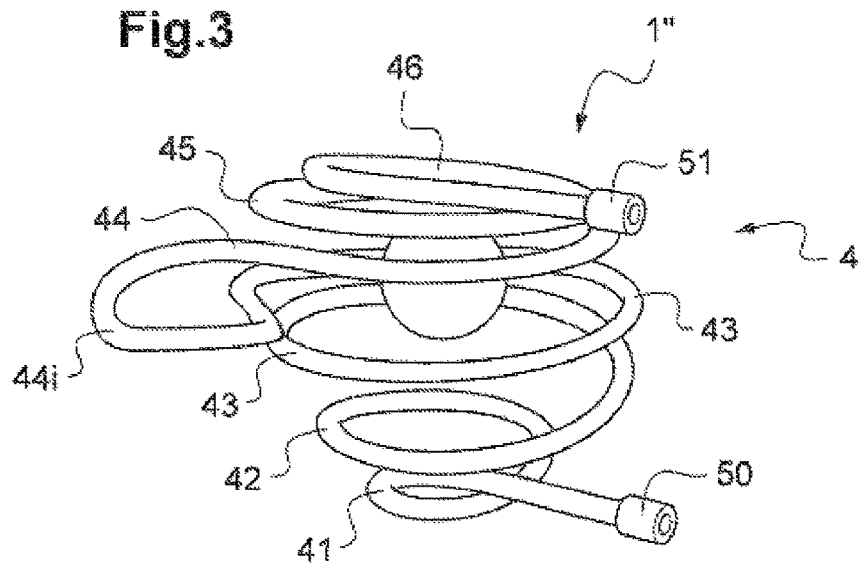
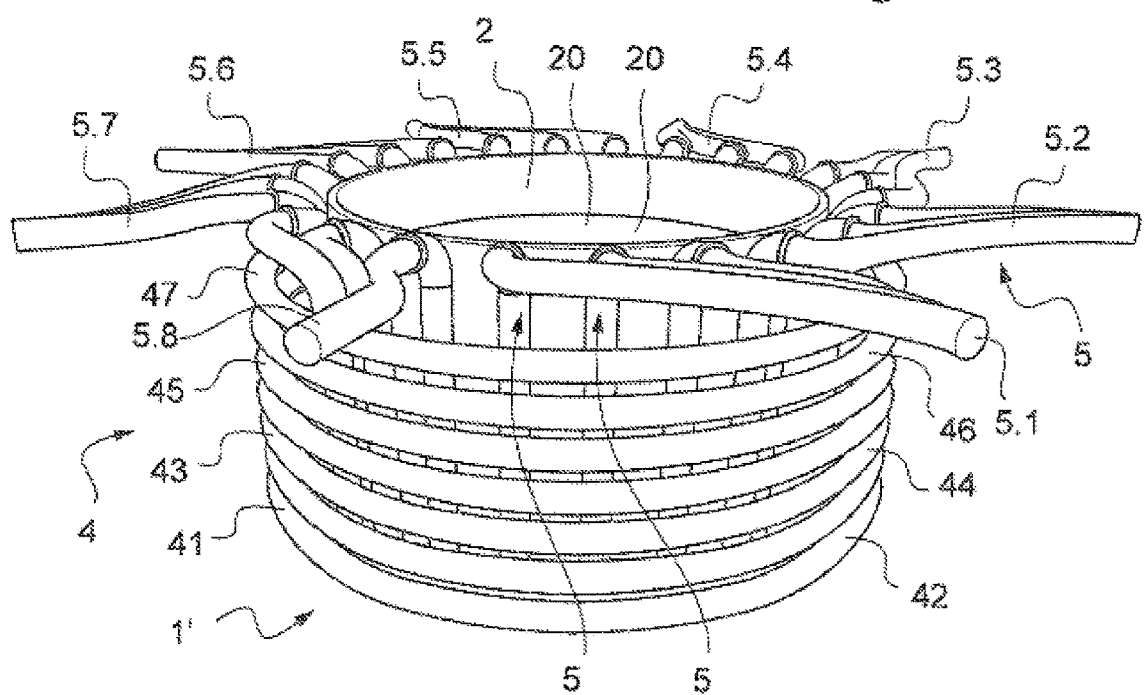

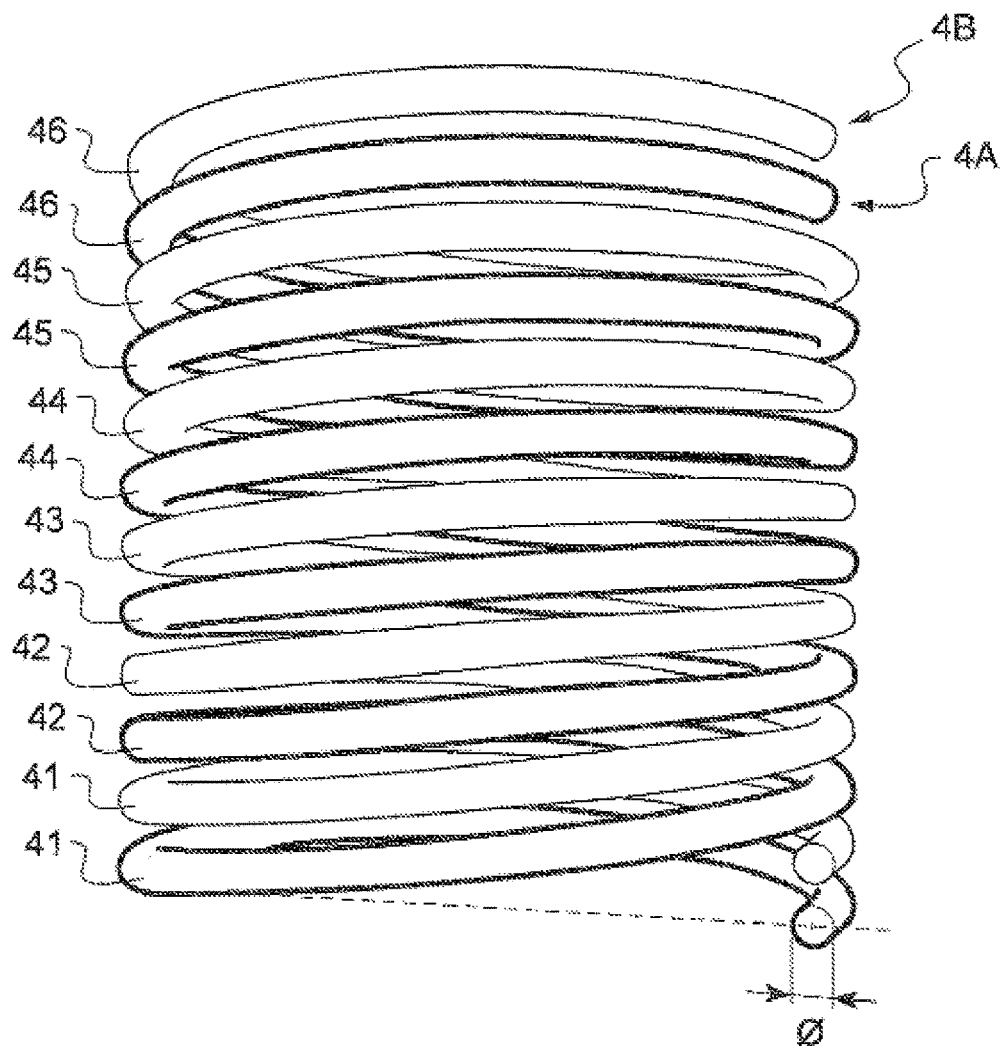

ELECTROMAGNETIC INDUCTION FURNACE AND USE OF THE FURNACE FOR MELTING A MIXTURE OF METAL(S) AND OXIDE(S), SAID MIXTURE REPRESENTING A CORIUM

TECHNICAL FIELD

The present invention relates to an electromagnetic induction furnace, intended to melt at least one electrically conductive material, such as an oxide and/or metal, comprising at least one inductor having at least one turn and at least one cooling circuit suitable for cooling at least the inductor.

It relates more particularly to the use of a novel heat transfer fluid in at least one of the cooling circuits.

One furnace particularly targeted by the invention is a furnace referred to as a cold crucible furnace, also referred to as a self-crucible furnace.

Although described with reference to a cold crucible furnace, the invention also applies to any electromagnetic induction furnace, whether it is produced with a crucible, i.e. with physical walls that define a container, such as a crucible made of refractory or metallic material, or produced without a crucible.

One particularly advantageous application that is targeted is the melting of a mixture of metal(s) and oxide(s), such as uranium oxide $UO_2$, representative of a corium, with a view to studying the interactions of said corium with a heat transfer fluid, such as liquid water or sodium. A corium is a mixture of molten materials ($UO_2$, $ZrO_2$, Zr, steel) which, in the case of serious nuclear accidents, is capable of forming during the melting of the assemblies of nuclear fuels and nuclear control rods.

Although described with reference to the melting of a corium, the invention also applies to the electromagnetic induction melting of any electrically conductive material in which a cooling circuit is required. The invention thus applies in particular to the furnaces used in foundries or in metallurgy.

PRIOR ART

In the foundry or metallurgy field, the production of materials generally requires them to be melted and kept in their liquid state for a long enough time to obtain the homogenization of the liquid with respect to the various constituents or of the temperature or to enable chemical reactions to be carried out within the liquid. In order to do this, it is important that a turbulent mixing stirs the liquid. Thus, in these fields, a very common process for carrying out the melting of large masses of metal is electromagnetic induction heating in a crucible furnace. The major advantages of such a process are its simplicity of use, its efficiency and the fact that it avoids any contact between the source of thermal energy and the metal.

Illustrated in FIG. 1 is an induction furnace 1 comprising a crucible 2 intended to contain a charge 3, that is to say a certain mass and volume of an electrically conductive material. The crucible 2 is surrounded by an inductor 4 supplied with alternating current at a certain high frequency, intended to heat the charge 3 contained in the crucible by electromagnetic induction.

As illustrated in this FIG. 1, the walls of the crucible are made of a refractory material, for example graphite. One drawback of these crucibles is that their walls rise to the temperature of the charge. Thus, the refractory material constituting these walls and the impurities that are contained therein are capable of diffusing into the charge, which is particularly troublesome in the case where the crucibles are intended to contain highly reactive materials, for example alloys based on titanium or silicon, the treatment of which is intended to provide a product of very high purity. This is also troublesome in the particular field of implementation which is that of the inventors: specifically they have been confronted with the need to carry out the melting of a mixture of metal and oxides representative of a corium ($UO_2$, $ZrO_2$, Zr, steel). However, not only does the same problem of diffusion into the charge of the refractory material arise, but also the temperature to be achieved for melting the corium is of the order of 3000 K, the melting point of $UO_2$ being of this order of magnitude. No refractory material, except for thoria ($ThO_2$), the provision of which is rendered impossible due to the radioactive nature of thorium (Th), is capable of withstanding this temperature, due to the presence of high-temperature metal.

Thus, the possible solution for carrying out the melting of reactive materials with the refractory materials and/or materials of very high melting point consists in using a crucible that uses the same principle of electromagnetic induction heating but is referred to as a cold crucible or else a cold-wall crucible. The literature also refers to an induction furnace of self-crucible type since, at the internal periphery of the furnace, against the cold walls, a solidified layer of the actual material of the charge is formed which may be considered as constituting the internal wall of the crucible. Cold-crucible furnaces have already been well-tried in small amounts, typically several tens of kilos of metal charge.

Figure 2:
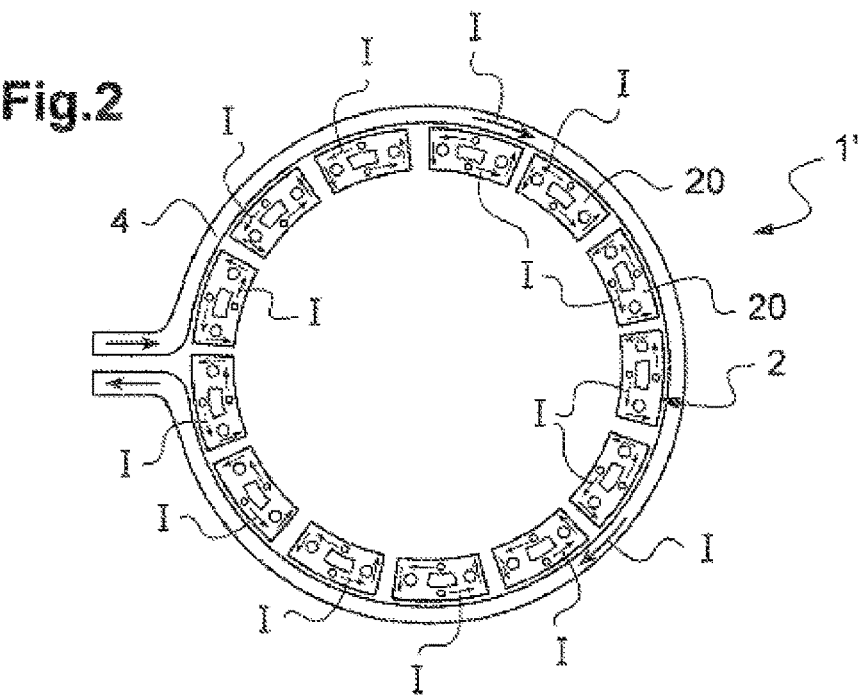

Represented as a top view, in FIG. 2, is such a cold crucible 1': the crucible 2 is formed by a wall made of electrically conductive material, divided vertically into several hollow, longitudinal sections 20 that are electrically insulated from one another. These sections 20 are commonly made of a metal such as copper which has the advantage of having a low electrical resistivity and of having good heat exchange qualities. These sections are moreover passed through internally by a flow of coolant (not represented), commonly water. This coolant makes it possible to keep the internal surface of the sections 20 in contact with the liquid charge at a temperature well below the melting point of the charge, typically below 300° C.

This crucible 2 is arranged inside an inductor 4 supplied with alternating current I which creates induced currents I in the sections 20, which currents I close up by running through the internal wall of the crucible and in which they create a magnetic field. Thus, the high-frequency current flowing in the inductor 4 produces a peripheral current in each of the sections 20. Found on the internal wall of each section 20 is a current I similar to the current flowing in the inductor multiplied by the number of turns thereof. All of the currents at the internal periphery of each section 20 produce an electromagnetic field suitable for heating the contained charge of the crucible. Indeed, any electrically conductive material in such a crucible is the seat of the induced currents which, in interaction with the magnetic field created by the inductor 4, leads to the appearance of electromotive forces known as Laplace forces. Thus, the induced currents make it possible to heat the material(s) of the charge until melting occurs and the liquid charge is mixed due to the Laplace forces.

Due to the cooling circuit, the temperature of the internal surface of the sections 20 is much lower than that of the molten charge, and a rapid solidification of the molten material occurs in contact with the sections 20 of the crucible 2 and also with the bottom of the furnace, referred to as the floor, which creates a solid diffusion barrier layer preventing any reactivity between the material of the sections and the molten material. In other words, a thin crust is created by solidification of the charge over several millimeters.

Thus, the cold crucible furnaces have all the advantages of the refractory crucible induction furnaces mentioned above, such as the use at high temperatures, in addition with a high purity of the charge due to the absence of pollution by the crucible, the carrying out of mixing which renders the composition of the molten liquid charge uniform and improves the heat transfers and therefore increases the temperature homogeneity.

Cold-crucible furnaces, referred to as levitation furnaces, may also operate according to a levitation principle. Specifically, the internal walls of the crucible may be provided with a conical shape toward the bottom so that the cross section of the latter is smaller at the bottom than at the top. However, in principle, the product of the magnetic field and the cross section of the crucible is substantially constant over the axis of the crucible. The result of this is therefore a magnetic field that increases greatly from the top to the bottom of the crucible. This configuration is perfectly suitable for the levitation of a material since the induced repulsive forces, i.e. the Laplace or Lorentz forces, in an electrically conductive material placed in the crucible, are very high at the lower portion of the material and decrease towards the upper portion. An electrically conductive material in solid or liquid form may therefore be maintained in stable levitation in such a crucible. Since the crucible is cold, any power interruption is not dangerous since the liquid spilling into the crucible solidifies. Switching the inductor back on makes it possible to remelt the material and to resume the levitation. In the levitation state, the material may be placed in contact with a controlled atmosphere so as not to undergo degradation. Furthermore, the electromagnetic forces induced a turbulent mixing in the molten liquid. The melting conditions so as to obtain a high purity may therefore be achieved: the melting takes place without contact and the heat exchanges between the material and the crucible take place by radiation: they therefore remain very limited.

Furnaces that operate according to the levitation principle also exist without a crucible. Represented in FIG. 3 is such a crucible-free levitation furnace 1". As illustrated, the sole inductor (induction coil) 4 of such a furnace 1" consists of six turns 41, 42, 43, 44, 45, 46. So that the electromagnetic levitation of the electrically conductive material placed inside the inductor takes place correctly via the Laplace forces, the inductor (coil) 4 must have a conical shape, narrowed at the bottom, hence the winding shape with increasing diameter of the lower turns 41, 42, 43. The conical form thus delimited by the lower turns 41, 42, 43 enables, when the coil 4 is powered under an alternating current, the appearance of the Laplace forces which push the charge 3 to be melted, as represented in the form of a sphere in FIG. 3, sufficiently upward. These Laplace forces oppose gravity. In order for the charge 3 not to be ejected out of the coil 4, it is additionally necessary to create forces that bring it back downward. In order to do this, the currents above the charge 3 are reversed by making a loop in the winding: thus, as illustrated in FIG. 3, the turn 44 is shaped into a loop 44*i* outside of the winding axis of the other turns. The currents then flow at this level in the opposite direction and create, in the charge 3, other Laplace forces which push it downward. Thus, by ensuring a precise sizing of the turns 41, 42, 43, 44, 45, 46 with the loop 44*i* for reversing the current, an equilibrium is created between the forces oriented upward and those oriented downward which are applied to the charge 3 in order to enable the levitation thereof.

Moreover, such a crucible-free levitation furnace 1" comprises a cooling circuit that passes through the inside of the inductor 4. Thus, as illustrated in FIG. 3, the turns 41-46 are hollow and water, as heat transfer fluid, penetrates at the lower end into the feed opening 50 and exits therefrom via the outlet opening 51. Thus, the flow of water that flows through the inductor 4 makes it possible to cool it during its operation.

Until now, water has been used as a coolant for the crucible and/or for the inductor of the induction furnaces that have just been described. Indeed, water is largely sufficient for the melting temperatures of the electrically conductive materials that it is desired to melt.

The inventors are being confronted with the need to find another heat transfer fluid to replace the water, in general deionized water, in a cooling circuit of an induction furnace for the reasons already mentioned in the previous section.

Thus, not only have the inventors had to propose equipment for the actual step of melting a corium, but in addition this equipment must make it possible, inter alia, to study the interaction of the molten corium with sodium. Thus, such equipment is provided so that the molten corium is extracted by draining of the furnace into a container filled with sodium. However, as is widely known, sodium reacts violently with water. Therefore, the regulations relating to the safety standards prohibits any use of water in the presence of sodium and therefore this applies to equipment targeted by the inventors.

Patent EP 1 419 675 B1 discloses a solution which consists in using heat pipes as cooling elements in order to reduce the amounts of water in the cooling circuits of the cold-crucible furnaces. The solution disclosed cannot be applied to the equipment targeted by the inventors since the fluid present within the heat pipes is still water, which is therefore strictly prohibited by the regulations.

An improvement of this patent EP 1 419 675 B1, with a view to responding to the regulations, could consist in replacing the water with another fluid in the heat pipes. However, this would introduce the problems of cooling the heat pipes themselves.

Furthermore, beyond the need to replace water with another heat transfer fluid for safety regulation reasons, the cooling of the induction furnaces which have just been described is not optimal in terms of heat balance, when it is carried out with water. Indeed, the heat capacity Cp of water is low and therefore, in an induction furnace, in particular a crucible induction furnace, of non-reduced dimensions, the cooling is far from being completely homogeneous over the entire height of the furnace and/or of the inductor(s).

There is therefore a need for a heat transfer fluid, or in other words a coolant, other than water in electromagnetic induction furnaces, in particular in cold-crucible furnaces.

There is a particular need for another heat transfer fluid that is not electrically conductive to avoid any interference of the electromagnetic induction during the operation of the furnaces.

SUMMARY OF THE INVENTION

In order to do this, a subject of the invention is, according to one of its aspects, an electromagnetic induction furnace intended to melt at least one electrically conductive material, such as an oxide and/or a metal, comprising at least one inductor having at least one turn and at least one cooling circuit suitable for cooling at least the inductor, characterized in that the heat transfer fluid of at least one cooling circuit is supercritical $CO_2$.

The expression "supercritical $CO_2$" is understood to mean $CO_2$ in the supercritical phase, that is to say under pressure and temperature conditions greater than those of its critical point, characterized by a pressure Pc of the order of 73 bar and a temperature Tc of the order of 31° C.

In other words, the invention consists in using supercritical $CO_2$ cooling in an induction furnace, which firstly enables an improvement in the safety of the latter with:
- prevention of explosions of vapors and sprays of molten liquid,
- improvement in the detection of leaks: specifically, when the heat transfer fluid is water, as in the prior art, it is difficult to detect a leak of small size whereas the detection of $CO_2$ by detectors and the evacuation thereof in a ventilation system around the furnace are easy.

Moreover, while being safer, the use of supercritical $CO_2$ according to the invention in an induction furnace improves the general cooling thereof in comparison with cooling according to the prior art with demineralized water. Indeed, supercritical $CO_2$ also offers the advantage of having a high heat capacity Cp, typically of the order of 30 to 40 kJ/kg at around 35° C. at a pressure of 80 bar, far higher than that of water. This enables degrees of freedom in the design of the induction furnaces and, in particular, the diameter of the crucible wall sections and that of the inductor turns may be smaller than those according to the prior art in a cold-crucible furnace. It is thus possible, according to the invention, to increase the number of turns of the inductor(s) and of sections of the crucible walls and to significantly reduce the bulkiness of the pipes of the cooling circuit(s). Moreover, with supercritical $CO_2$ as heat transfer fluid, it is possible to adapt the flow rate in order to optimize the cooling capacity at the center of the crucible of the furnace which is the zone where the temperature is highest. Thus, owing to the invention, the temperature in the crucible of an induction furnace is more uniform than in a crucible according to the prior art.

Cooling of an induction furnace with supercritical $CO_2$ according to the invention has the essential advantage of being able to be carried out on an industrial scale since it is clean, rapid and easily controllable and uses a very small amount of raw materials (low volume of supercritical $CO_2$) unlike the cooling with water according to prior art. Furthermore, supercritical $CO_2$ has advantage of being able to be easily recycled.

Supercritical $CO_2$ is widely envisaged for replacing hydrofluorocarbons (HFCs) as a coolant in motor vehicle air conditioning systems. Moreover, as indicated in patent application EP 1 762 809, it has already been envisaged as a coolant in heat exchangers. Finally, it is also increasingly used as a solvent in industrial chemistry [1]. Surprisingly, the use of supercritical $CO_2$ in a furnace, a fortiori in an induction furnace, has never been envisaged. According to one advantageous embodiment, the furnace comprises at least one inductor having at least two consecutive turns, the winding directions of which are reversed by forming a loop in order to reverse the direction of the electric current that passes through them, so as to form a levitation furnace.

According to one advantageous embodiment, the furnace comprises a crucible for containing the material to be melted.

According to this embodiment and according to one advantageous variant, the furnace comprises a cooling circuit suitable for cooling the walls of the crucible.

The walls of the crucible are preferably made of an electrically conductive material, preferably made of copper, so as to form a cold-crucible furnace.

The walls of the crucible or self-crucible advantageously comprise a bottom, referred to as the floor. The floor may be removable or comprise one or more through-orifices for discharging at least the molten material.

The floor is preferably made of an electrically conductive material, preferably made of copper.

According to one preferred embodiment variant, the furnace comprises an inductor that operates simultaneously at at least two different frequencies.

Alternatively, according to another preferred variant, the furnace comprises at least two separate inductors that operate simultaneously at different frequencies.

Advantageously, one of the operating frequencies is suitable for melting one or more metals and another operating frequency is suitable for melting one or more oxides.

The operating frequency or frequencies of at least one inductor is (are) preferably between 10 and 500 kHz.

Another subject of the invention is, according to another of its aspects, an operating process of a furnace that has just been described, wherein supercritical $CO_2$ is circulated at a pressure between its critical pressure Pc, of the order of 73 bar, and 100 bar and temperatures between its critical temperature Tc, of the order of 31° C., at the inlet of said at least one cooling circuit and 50° C. at the outlet of said at least one cooling circuit so as to have a specific heat capacity Cp of the supercritical $CO_2$ at least equal to 4 $kJ.kg^{-1}$.

Another subject of the invention is, according to another of its aspects, an operating process of a furnace that has just been described, wherein an alternating current is circulated in at least one inductor, simultaneously at at least two different frequencies.

A final subject of the invention is the use of the furnace described above for melting a mixture of at least one or more metals with one or more oxides.

The mixture may be a mixture of metals (steel, zirconium, etc.) with oxides (uranium $UO_2$, zirconia, etc.) and also components of the concrete, the mixture being representative of a corium.

DETAILED DESCRIPTION

Figure 6:
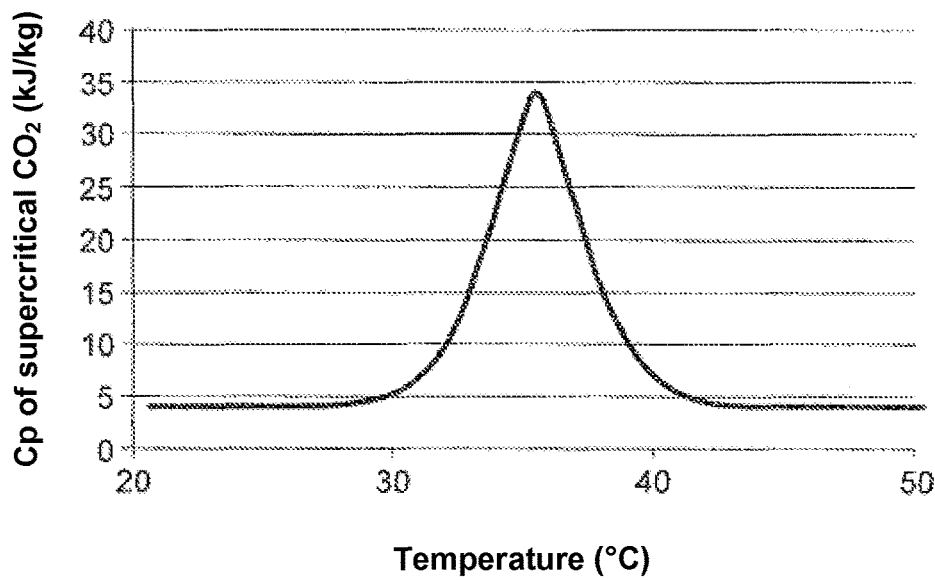
Figure 7:
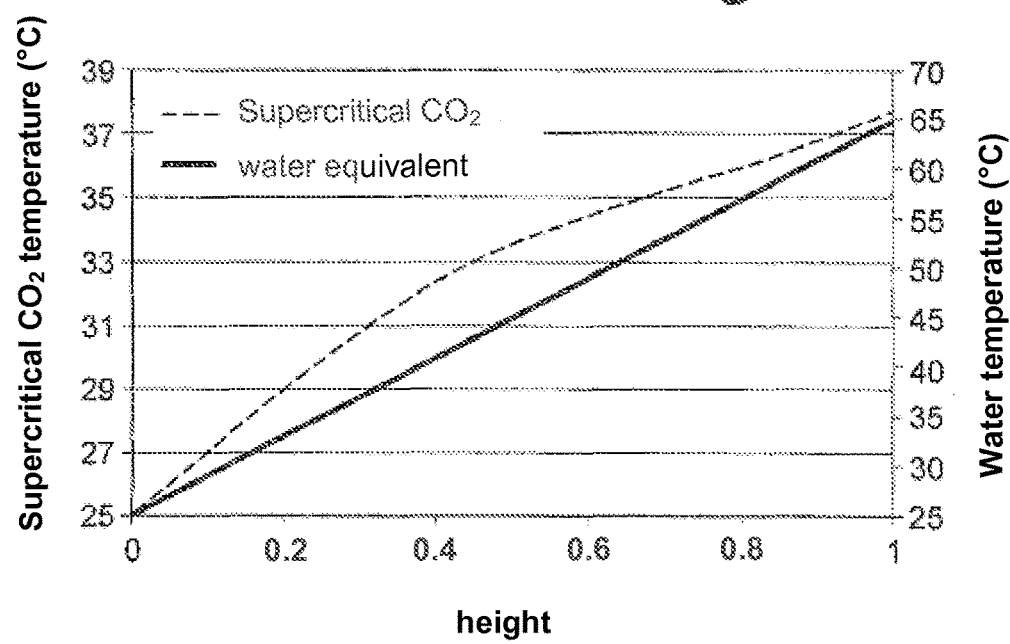

Other advantages and features will emerge more clearly on reading the detailed description, given by way of illustration and non-limitingly, with reference to the following figures, among which:

FIG. 1 is a partially cutaway perspective view of a crucible furnace with electromagnetic induction heating capable of using the cooling circuit according to the invention, FIG. 2 is a schematic top view of a crucible furnace also with electromagnetic induction heating that forms a cold-crucible furnace also capable of using the cooling circuit according to the invention, FIG. 3 is a perspective view of a crucible-free induction furnace that forms a levitation furnace also capable of using the cooling circuit according to the invention, FIG. 4 is a perspective view of a cold-crucible furnace comprising a cooling circuit according to the invention, FIG. 5 is a perspective view showing two identical inductors having helical turns capable of being arranged concentrically one inside the other around an induction furnace according to the invention, FIG. 6 illustrates a curve of the change in the heat capacity Cp of the supercritical $CO_2$ used in accordance with the invention as coolant for an induction furnace, FIG. 7 illustrates a curve of the variation in the temperature of the supercritical $CO_2$ in a channel of given dimensions and at a given flowrate and, by way of comparison, the curve of the variation of water under equivalent channel dimension and flow rate conditions.

Throughout the present application, the terms "vertical", "lower", "upper", "bottom", "top", "below" and "above" should be understood with reference relative to an induction furnace arranged in a vertical operating configuration. Thus, in an operating configuration, the furnace is arranged vertically with its bottom through which the molten material is discharged, downward.

FIGS. 1 to 3 have already been commented upon in the preamble. They are not therefore described in detail hereinbelow.

Represented in FIG. 4 is a cold-crucible furnace 1' comprising at least one cooling circuit 5 in accordance with the invention, i.e in which the heat transfer fluid is supercritical $CO_2$. Such a furnace 1' is preferably intended to carry out the melting of a charge consisting of a mixture of metal(s) and oxide(s), such as the uranium oxide $UO_2$, representative of a corium.

Such a furnace 1' comprises a copper crucible 2 surrounded by an inductor, i.e. an electromagnetic induction coil 4 having at least one turn. In the example represented, the inductor 4 comprises seven consecutive turns 41-47 that are identical and equidistant from one another.

Although not represented, the sidewall of the crucible 2 is divided into a certain number of identical sections 20. This number is equal to 8 in the example of FIG. 4.

The crucible 2 also comprises a bottom, referred to as the floor, which is not represented. The bottom may be removable or may be pierced with one or more through-openings in order to enable the discharge of the material or mixture of materials once this or these material(s) is (are) in the liquid state via melting.

By thus dividing the sidewall of the crucible 2 into sections 20, when the alternating current passes through the turn(s) of the inductor 4, the induced currents do not remain localised at the periphery of the crucible, but go around each section 20, as already explained in the preamble in connection with FIG. 2. Thus, the current I passing through the inductor 4 (coil) induces on the crucible 2 a current which in turn induces a current inside the charge containing at least one electrically conductive material, which is housed in the crucible. The charge then melts via the Joule effect. When the molten charge has become liquid, it comes into contact with the walls of the crucible 2 that are cooled by the cooling circuit 5, which solidifies it, thus creating a self-crucible, that is to say a solid layer made from the material(s) of the charge introduced initially into the crucible 2.

The use of such a cold-crucible furnace 1" is advantageous for melting a charge consisting of a mixture of uranium oxide and metal representative of a corium. Indeed, the melting point of uranium oxide is of the order of 2865° C., much higher than the melting point of the metals, in particular stainless steel. The metal at these temperatures is characterized by a virtually zero viscosity, that is to say that it may infiltrate into the smallest crack of the crucible. With the formation of the self-crucible as explained above, it is ensured, on the one hand, that the metal present in the charge to be melted cannot in any case attack the constituent metal of the walls of the crucible and, on the other hand, that the mixture of materials retains its initial purity.

Preferably, an element, not represented, made of electrically insulating material is arranged between two consecutive (adjacent) sections 20. Such an insulating element serves not only to prevent leaks and decrease heat losses but also to minimize the formation of an electric arc between the copper sections 20 during the operation of the furnace.

As illustrated in FIG. 4, the cooling circuit 5 according to the invention with supercritical $CO_2$ is also divided into a number of cooling sections arranged at the periphery of the sections 20 of the crucible 2. In the example illustrated, the number of cooling sections, 5.1 to 5.8 is equal to that of the copper sections 20, i.e. eight sections. More specifically, as illustrated in FIG. 4, each section 5.1 to 5.8 comprises three tubes joined outside of the section 20 of sidewall of the crucible 2 and which open into a common collector. The tubes are advantageously made of an electrically conductive material, preferably made of copper. As regards the method of attaching the tubes to the walls of the crucible 2, any known means may be envisaged. By way of example, it is possible to envisage attachments with the aid of plates made of thermally insulating material that withstands the high temperatures.

Thus, according to the invention, during the operation of the furnace, supercritical $CO_2$ is circulated inside each tube of the cooling sections 5.1 to 5.8.

Moreover, in accordance with the invention, it may be envisaged to cool the turns 41 to 48 of the inductor 4 via an additional cooling circuit inside the inductor. In other words, it is possible to envisage a circulation inside the turns 41 to 48 of the inductor 4 with supercritical $CO_2$.

According to one advantageous embodiment, when the charge to be melted consists of a mixture of oxides and at least one metal, such as a mixture representative of a corium, an alternating current that operates simultaneously at at least two different frequencies is made to flow in the inductor 4. Indeed, the temperature of the metal, such as steel typically in the vicinity of 1300° C., is substantially lower than those of the oxides, such as uranium oxide $UO_2$ in the vicinity of 2865° C.

Thus, by supplying with current at two different frequencies, one of which is suitable for induction melting of the metal(s) and the other for induction melting of the oxides, a simultaneous melting of the constituents of the mixture is ensured while ensuring mixing and therefore a homogeneous mixture, and in addition it is ensured that, throughout the melting process, the metal or metals do not come directly into contact with the walls of the crucible. Indeed, on the one hand, for a same material, the lower the induction frequency, the more the electromagnetic wave will penetrate said material and therefore generate Joule effect heating in the bulk. Moreover, as stated previously, due to the difference in melting point, oxides require higher induction frequencies and the metal(s) lower frequencies. Finally, once the melting process in the furnace is started, the metal(s) has (have) a virtually zero viscosity when the oxides begin to melt. Thus, by using a single induction frequency for the operation of a furnace according to the invention, there remains a risk of the molten metal(s) infiltrating into the smallest crack present in the walls of the crucible. There is also a risk of the metal(s) agglomerating on said walls, which would have the deleterious effect of creating a screen to the electromagnetic waves and optionally of deteriorating the inductor. Consequently, the operation of a furnace according to the invention at two different frequencies makes it possible to avoid, at the very least reduce, these risks: throughout the melting process, the metal(s) is (are) pushed back towards the inside of the crucible. A homogeneous mixture is thus obtained in an equilibrium system of the molten constituents.

Thus, preferably, the operating frequencies of the inductor 4 are between 10 and 500 kHz. An effective operating frequency is in the vicinity of 100 kHz.

As a variant, it is possible to envisage the use of two separate inductors, one operating with a frequency suitable for the induction melting of the metal(s) and the other operating with a frequency suitable for induction melting of the oxides. This variant is facilitated by the use of supercritical $CO_2$, which, owing to its greater effectiveness, makes it possible to envisage a reduction by a factor of two in the diameter of the turns. Represented in FIG. 5 are two identical inductors 4A, 4B each with six helical turns 41-46 which may be arranged concentrically inside one another around the crucible 2 described above, instead of the single inductor 4. Owing to the use of supercritical $CO_2$ as coolant according to the invention, it is possible to envisage a diameter Ø of the turns of the two inductors 4A, 4B which is two times smaller than that of the single inductor 4.

FIG. 6 clearly shows the substantial advantage of using supercritical $CO_2$ instead of water as coolant for an induction furnace owing to the specific heat capacity Cp (heat capacity). Thus, it emerges from this curve from FIG. 6 that the heat capacity Cp increases very greatly between 30° C. and 40° C. and achieves a value close to 35 $kJ.kg^{-1}$, i.e. a value up to 10 times greater than that of water. Therefore, according to the invention, it is possible to envisage a very substantial reduction in the diameter of the sections 20 of crucible walls and/or in the diameter of the turns of the inductor 4, up to a factor of two relative to the dimensions of existing cold-crucible furnaces.

FIG. 7 additionally indicates a comparison in the variation of the temperature of the fluid in a channel of given dimensions at a given flow rate, respectively with supercritical $CO_2$ according to the invention and an equivalence (diameter and flow rate) with water according to the prior art. It is observed that the variation in the temperature of the water is linear where as that of the supercritical $CO_2$ increases more rapidly due to the increase in the heat capacity of the latter with the temperature. It may be deduced therefrom that with supercritical $CO_2$ it is possible to adapt the flow rate in order to optimize the cooling capacity at the center of the crucible 2 of an induction furnace, that is to say at the location where the temperature is maximal. Thus, an advantage subsequent to the use of supercritical $CO_2$ as coolant for a crucible induction furnace is to render the temperature in said crucible more uniform.

The invention is not limited to the examples which have just been described; in particular, features of the examples illustrated may be combined with one another in variants that are not illustrated.

REFERENCE CITED

[1]: "Utilisation du CO2 supercritique comme solvant de substitution" [Use of supercritical CO2 as substitution solvent], Guy LUMIA, Techniques de l'Ingénieur In5

The invention claimed is:

1. An electromagnetic induction furnace intended to melt at least one electrically conductive material, comprising:
   at least one inductor having at least one turn,
   a cooling circuit configured to circulate a heat transfer fluid inside the at least one turn of the at least one inductor in order to cool at least the at least one inductor, said cooling circuit for cooling the at least one inductor comprising an inlet and an outlet,
   a crucible for containing the at least one electrically conductive material to be melted comprising walls, and
   a cooling circuit configured to circulate a heat transfer fluid in order to cool the walls of the crucible, said cooling circuit for cooling the walls of the crucible comprising an inlet and an outlet,
   wherein the heat transfer fluid of at least the cooling circuit for cooling the walls of the crucible is supercritical $CO_2$.

2. The furnace as claimed in claim 1, wherein the at least one inductor has at least two consecutive turns, the winding directions of said consecutive turns being reversed by forming a loop in order to reverse a direction of an electric current that passes through them, so as to form a levitation furnace.

3. The furnace as claimed in claim 1, wherein the walls of the crucible are made of an electrically conductive material so as to form a cold-crucible furnace.

4. The furnace as claimed in claim 1, the walls of the crucible or self-crucible comprising a bottom, referred to as the floor.

5. The furnace as claimed in claim 4, wherein the floor is removable.

6. The furnace as claimed in claim 4, wherein the floor comprises one or more through-orifices for discharging molten material.

7. The furnace as claimed in claim 5, wherein the floor is made of electrically conductive material.

8. The furnace as claimed in claim 1, comprising a single inductor that operates simultaneously at at least two different frequencies.

9. The furnace as claimed in claim 1, comprising two or more separate inductors, wherein at least two separate inductors operate simultaneously at different frequencies.

10. The furnace as claimed in claim 8, one of the operating frequencies being suitable for melting one or more metal(s) and another operating frequency being suitable for melting one or more oxide(s).

11. The furnace as claimed in claim 1, wherein the operating frequency or frequencies of at least one inductor is between 10 and 500 kHz.

12. A process of operating a furnace as claimed in claim 1, comprising circulating supercritical $CO_2$ at a pressure between its critical pressure Pc, of the order of 73 bar, and 100 bar and temperatures between its critical temperature Tc, of the order of 31° C., at the inlet of at least one of said cooling circuit for cooling the at least one inductor and said cooling circuit for cooling the walls of the crucible, and 50° C. at the outlet of at least one of said cooling circuit for cooling the at least one inductor and said cooling circuit for cooling the walls of the crucible so as to have a specific heat capacity Cp of the supercritical $CO_2$ at least equal to 4 $kJ.kg^{-1}$.

13. A process of operating a furnace as claimed in claim 1, comprising circulating an alternating current in the at least one inductor, simultaneously at at least two different frequencies.

14. A process of operating a furnace as claimed in claim 1, comprising melting a mixture of at least one or more metals with one or more oxides.

15. A process of operating a furnace as claimed in claim 14, wherein the mixture is a mixture of metals comprising steel and zirconium with oxides comprising uranium $UO_2$ and zirconium and also components of a concrete, the mixture being representative of a corium.

16. The furnace as claimed in claim 7, wherein the electrically conductive material is copper.

* * * * *